US012667949B2

(12) United States Patent
Coulson et al.

(10) Patent No.: US 12,667,949 B2
(45) Date of Patent: Jun. 30, 2026

(54) SOUND SUPPRESSING DEVICE ATTACHMENT FOR TOOLS

(71) Applicant: Government of the United States, as represented by the Secretary of the Air Force, Wright-Patterson AFB, OH (US)

(72) Inventors: Zachary Coulson, Oklahoma City, OK (US); Bradley Sullivan, Shawnee, OK (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 412 days.

(21) Appl. No.: 18/072,893

(22) Filed: Dec. 1, 2022

(65) Prior Publication Data

US 2023/0249327 A1      Aug. 10, 2023

Related U.S. Application Data

(60) Provisional application No. 63/308,752, filed on Feb. 10, 2022.

(51) Int. Cl.
*B25D 17/11*      (2006.01)
*B25D 9/04*      (2006.01)
*B33Y 80/00*      (2015.01)

(52) U.S. Cl.
CPC ................ *B25D 17/11* (2013.01); *B25D 9/04* (2013.01); *B25D 2250/365* (2013.01); *B33Y 80/00* (2014.12)

(58) Field of Classification Search
CPC .......... B25D 17/11; B25D 17/12; B25D 9/04; B25D 2250/365; B25D 9/08; B33Y 80/00; E21B 12/00; B25F 5/02
(Continued)

(56) References Cited

U.S. PATENT DOCUMENTS 2,136,315 A * 11/1938 Pettit ...................... B25D 17/11
181/200
3,757,891 A * 9/1973 Krieger .................. G10K 11/16
181/205
(Continued)

FOREIGN PATENT DOCUMENTS

BR      102015023890 A2 * 3/2017
CN          2880398 Y * 3/2007
(Continued)

OTHER PUBLICATIONS

Translation of DE-4038415-A1 (Year: 1994).*
(Continued)

*Primary Examiner* — Dedei K Hammond
*Assistant Examiner* — Jennifer B Olson
(74) *Attorney, Agent, or Firm* — AFMCLO/JAZ; Jeffrey V. Bamber

(57) ABSTRACT
A sound suppressing device for reducing the sound made when using a piece of equipment or tool is disclosed. The sound suppressing device includes: an outer shell, a window in the top of the outer shell, a filler inside the outer shell, and a containment seal for the filler. The sound suppressing device has an opening extending between its top and bottom that is sized and configured to fit around a portion of the body of the tool that will be adjacent the work piece when the tool is in use.

2 Claims, 5 Drawing Sheets

(58) Field of Classification Search

USPC .......................... 181/256, 200, 201, 202, 205

See application file for complete search history.

(56) References Cited

U.S. PATENT DOCUMENTS

| | | | | |
|---|---|---|---|---|
| 4,015,683 A * | 4/1977 | Williams | .................. | F01N 1/24 |
| | | | | 181/231 |
| 10,995,551 B2 * | 5/2021 | Luoma | ................... | G10K 11/16 |
| 11,248,870 B1 * | 2/2022 | Nagy-Zambo | .......... | F41A 21/30 |
| 2020/0258492 A1 * | 8/2020 | Wood | ...................... | E21B 12/00 |
| 2021/0323257 A1 * | 10/2021 | O'Keefe | ................. | G01S 7/521 |

FOREIGN PATENT DOCUMENTS

| | | | | | |
|---|---|---|---|---|---|
| CN | 202725909 U | | 2/2013 | | |
| CN | 102989959 A | | 3/2013 | | |
| CN | 103085039 A | * | 5/2013 | | |
| CN | 211333055 U | * | 8/2020 | | |
| CN | 211342769 U | * | 8/2020 | | |
| CN | 113618117 A | * | 11/2021 | ............. | B23B 45/02 |
| DE | 4038415 A1 | * | 6/1992 | ............. | B23Q 11/08 |
| KR | 100986794 B1 | | 10/2010 | | |
| WO | WO-2014135031 A1 | * | 9/2014 | ......... | B23Q 11/0071 |

OTHER PUBLICATIONS

Machine translation of CN-211342769-U (Year: 2020).*

Machine Translation of CN-2880398-Y (Year: 2007).*

Machine Translation of CN-113618117-A (Year: 2021).*

Machine translation of WO-2014135031-A1 (Year: 2014).*

Machine translation of BR_102015023890 (Year: 2017).*

Machine translation of CN-211333055-U (Year: 2020).*

Machine translation of CN_103085039_A (Year: 2013).*

Shabbir, What is Cura's Gyroid Infill and Should You Use It? published on the internet at https://makershop.co/gyroid-infill/, updated Jan. 22, 2022.

Evans, A.G., M.Y. He, V.S. Deshpande, John W. Hutchinson, A.J. Jacobsen, and W. Barvosa-Carter, Concepts for Enhanced Energy Absorption Using Hollow Micro-Lattices, International Journal of Impact Engineering, Mar. 7, 2010, 37[9], 947-959, published by Digital Access to Scholarship at Harvard, published on the internet at http://nrs.harvard.edu/urn-3:HUL.InstRepos:4211042.

Libonati, Flavia, Serena Graziosi, Federico Ballo, Marco Mognato, and Giacomo Sala, 3D-Printed Architected Materials Inspired by Cubic Bravais Lattices, ACS Biomaterials Science & Engineering, published on the internet in Oct. 2021 at https://doi.org/10.2021/acsbiomaterials.0c01708.

* cited by examiner

SOUND SUPPRESSING DEVICE ATTACHMENT FOR TOOLS

Pursuant to 37 C.F.R. § 1.78(a)(4), this application claims the benefit of and priority to prior filed Provisional Application Ser. No. 63/308,752, filed Feb. 10, 2022, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to devices for suppressing noise and, more particularly, to devices for suppressing noise from air hammers and other equipment.

BACKGROUND OF THE INVENTION

The use of certain types of equipment can create high levels of noise. Such equipment includes, but is not limited to: air hammers (e.g., rivet guns), drills, pneumatic chippers, jackhammers, and air scribes.

One use of air hammers is in the removal of splice plates on aircraft. Currently, splice plates are removed via the application of force to the bolts holding the splice plates in place by air hammers, once the nuts are removed. Normally, force applied by an air hammer applied on the fasteners from within the aircraft is enough to break them loose. However, there are situations in which air hammers are used to apply force in opposite directions; from underneath directly on the fasteners, and from above right next to the head of the fasteners. In this case, the mechanics under the splice plates and the mechanics above may be exposed to unacceptably high levels of sound energy, even when wearing the OSHA standard double hearing protection.

Therefore, there is a need to provide devices to reduce sound energy exposure from the use of such tools.

SUMMARY OF THE INVENTION

The present invention relates generally to devices for suppressing noise and, more particularly, to devices for suppressing noise from air hammers and other equipment.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a sound suppressing device for reducing the sound made when using a tool is provided. The tool has a body and a functional part for interacting with a work piece. The device may comprise:

a three-dimensional shell having an upper surface, a lower surface, an interior, and an outer wall, wherein the shell has an opening therein that extends between its upper surface and its lower surface, wherein the opening is sized and configured to fit around a portion of the body of the tool that will be adjacent the work piece when the tool is in use;

at least one compartment located in the interior of the shell, wherein one compartment is located between the outer wall of the shell and at least one inner wall joined to the interior of the shell;

a filler material inside the at least one compartment; and a containment seal joined to the lower surface of the shell.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 3 is an exploded perspective view showing the assembly of the components of the sound suppressing device.

FIG. 4 is a perspective view of the outer shell of the sound suppressing device.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to devices for suppressing noise and, more particularly, to devices for suppressing noise from air hammers and other equipment.

The sound suppressing devices described herein can be used when operating various tools or types of equipment that create noise in use. Such equipment includes, but is not limited to: air hammers (e.g., rivet guns), drills, pneumatic chippers, jackhammers, and air scribes. The various tools may include a functional part such as a hammer bit, a drill bit, a chisel, or other type of implement.

Figure 1:
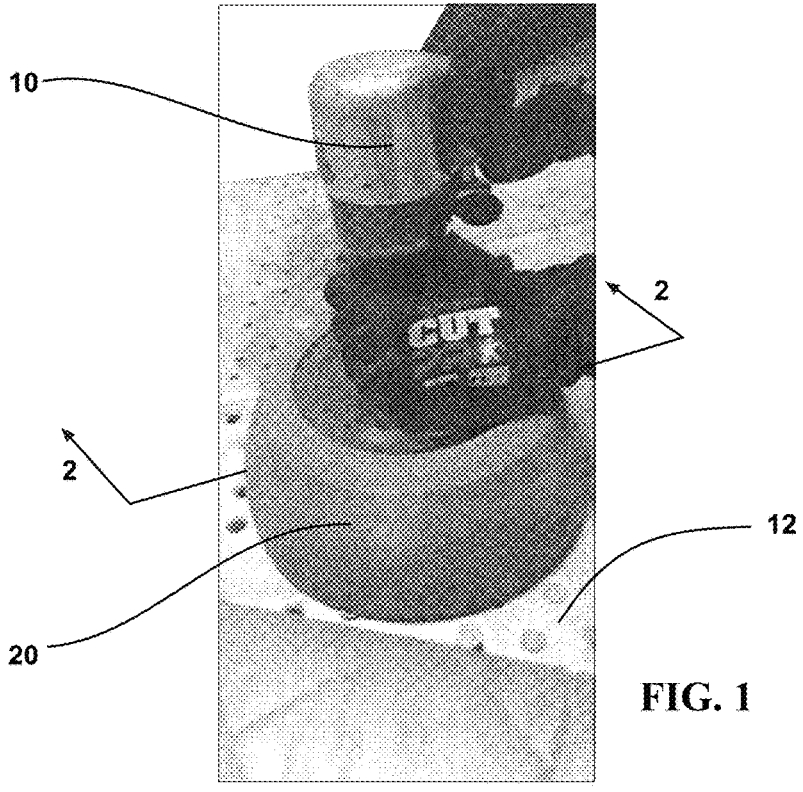
FIG. 1 is a perspective view showing the sound suppressing device in use with an air hammer.

FIG. 1 shows the sound suppressing device 20 in use with an air hammer 10. As shown in FIG. 1, the business end or functional part of the air hammer 10 is inserted into an opening that passes through the sound suppressing device 20. The opening passes completely through the sound suppressing device 20 so that the functional part of the air hammer is able to contact the work surface 12.

Figure 2:
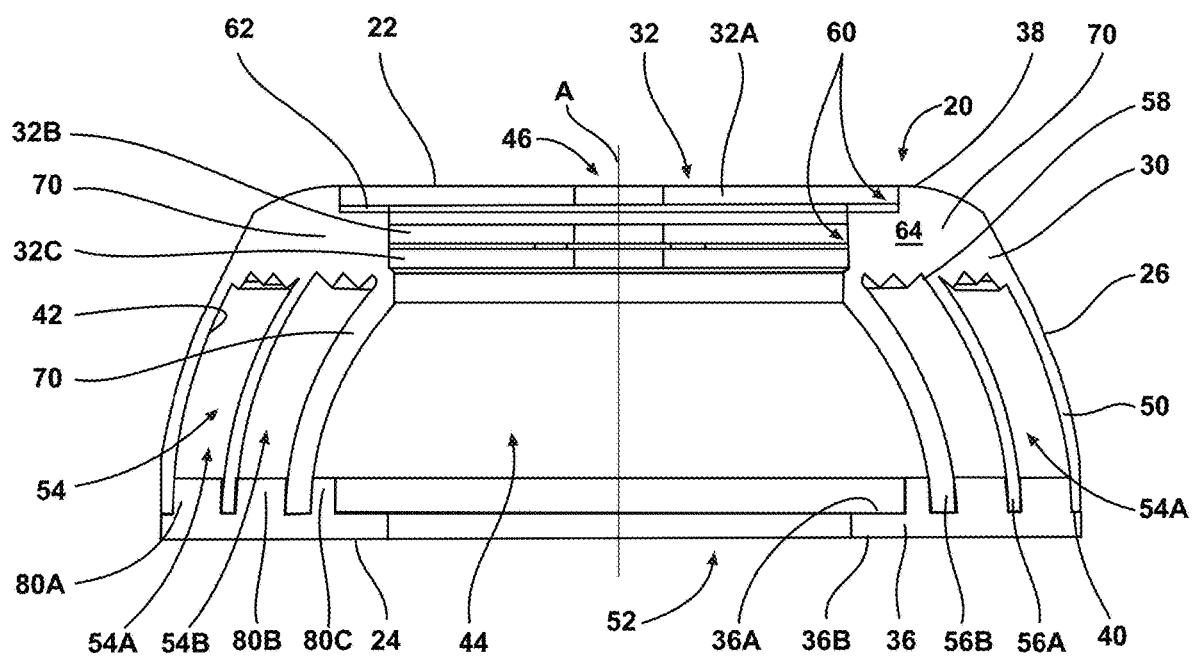
FIG. 2 is a cross-sectional view of the sound suppressing device taken along line 2-2 in FIG. 1.
Figures 3, 4:
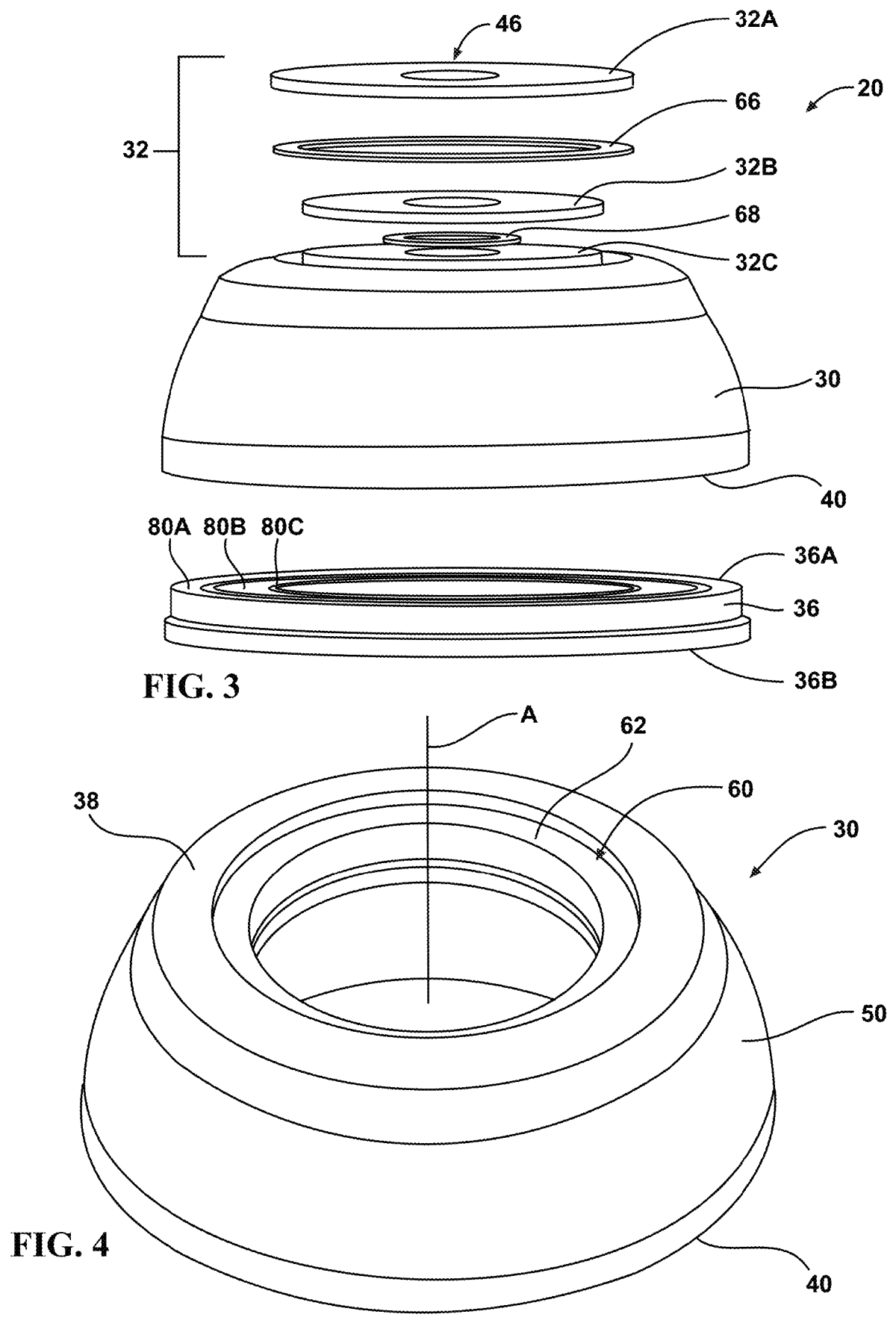

FIGS. 2 and 3 show the component parts of one embodiment of the sound suppressing device 20. The sound suppressing device 20 has a top surface 22, a bottom surface 24, and sides 26. The sound suppressing device 20 shown generally may comprise: a shell 30, a window 32 (which may be in the form of a layered set of windows) in the top of the shell, a filler 34 (shown in FIG. 10), and a containment seal 36 for the filler.

The shell (or "outer shell") 30 comprises a three-dimensional structure that has an exterior which has an upper surface 38 and a lower surface 40. The inner surface 42 of the shell defines the interior 44 of the shell 30. The sound suppressing device 20 and shell 30 have an opening 46 therein that extends between the upper surface 38 and the lower surface 40 of the shell 30. The opening 46 is sized and configured to fit around a portion of the body of the tool that will be adjacent the work piece or work surface when the tool is in use. The size and configuration of the opening 46 can be modified to fit a particular tool.

The shell 30 can have any suitable configuration. The shell 30 has an outer wall 50 and a central axis A. In the embodiment shown, the exterior surface of the shell is generally bowl-shaped. In use, the shell 30 resembles an inverted bowl. Cross-sections of the shell 30 taken perpendicular to the central axis A are generally circular. The mouth 52 of the bowl is circular, and is configured to be placed adjacent to the work surface. In other embodiments, the shell 30 can have other shapes including, but not limited to a square cross-section.

In the embodiment shown, the mouth 52 of the bowl-shaped shell 30 will not be directly in contact with the work surface, however, since the mouth 52 of the bowl fits into the top of the containment seal 36. The containment seal 36, in this embodiment, is the portion of the sound suppressing device 20 that may be in direct contact with the work surface. The points on the mouth 52 of the bowl may, in some cases, lie in the same plane so that the bottom of the sound suppressing device 20 will rest flat against a planar work surface. In other embodiments, components of the sound suppressing device 20 other than the containment seal 36 may be in direct contact with the work surface.

The interior 44 of the shell 30 comprises at least one compartment 54 for holding the filler material 34. In the embodiment shown, there are a plurality of compartments, more specifically two compartments 54A and 54B. These compartments are formed by at least one inner wall that is joined to the underside 58 of the top portion of the shell 30. In this case, there are two inner walls 56A and 56B, which may be referred to as first and second inner walls, respectively. These inner walls 56A and 56B have bowl-shaped side wall configurations similar to that of the exterior side wall 50 of the shell. The configuration of the interior of the shell 30 can, thus, be considered to be similar to that of a nested set of three bowls. In the embodiment shown, the portions of the underside 58 of the top of the shell 30 in the compartments 54A and 54B may have a saw tooth configuration to further interrupt the path of sound waves. The top of the shell 30 may have a recess 60 therein that forms one or more shelves 62 for the components of the window.

The shell 30 can be made in any suitable manner including, but not limited to molding, casting, and 3D printing. The shell 30 can be made of any suitable material or materials. The material may be rigid, or pliable. The shell 30 can be made of a single piece of material, or of several pieces of material that are joined together. In one embodiment, the shell 30 and inner walls 56A and 56B are a single 3D printed piece. In this embodiment, the shell 30 and the inner walls 56A and 56B are made from FDM® (fused deposition modeling) ASA (acrylonitrile styrene acrylate) UV stable thermoplastic filament material.

Figure 10:
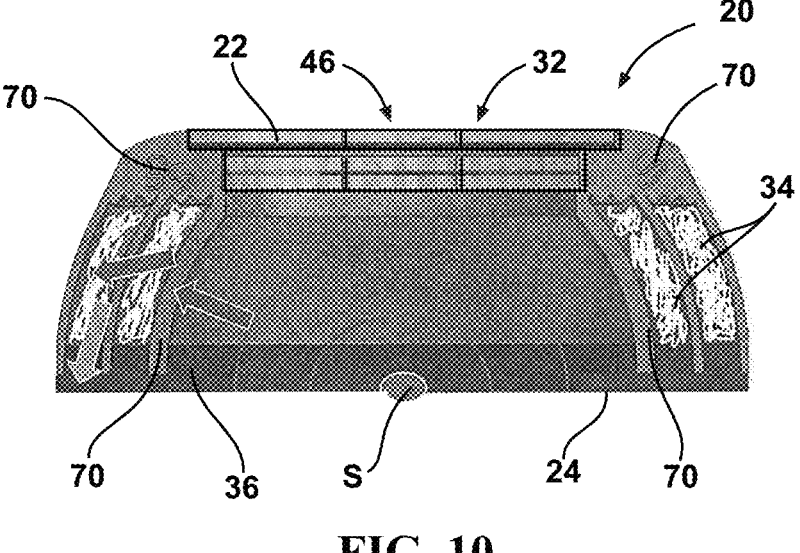
FIG. 10 is a schematic cross-sectional view of the sound suppressing device in operation.
Figure 11:
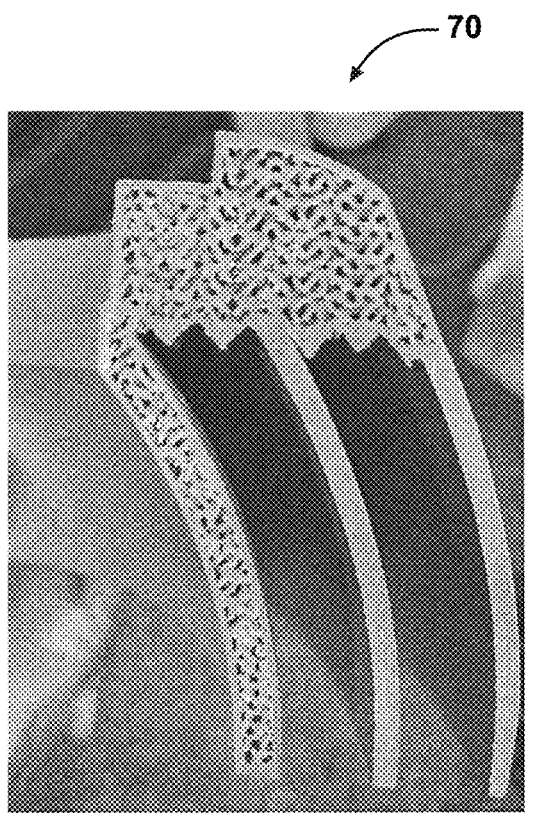
FIG. 11 is a perspective view of one embodiment of the shell of the sound suppressing device that has been cut to show a gyroid infill structure for portions of the shell.

In one embodiment, the upper portion 64 of the shell that is above compartments 54A and 54B is filled internally with a non-typically spaced gyroid infill 70. One inner wall, second inner wall 56B, may also be filled with the gyroid infill 70. The locations of the gyroid infill 70 are shown in FIGS. 2 and 10. Although the gyroid infill 70 is only shown on portions of these locations for simplicity of illustration, it is understood that any suitable portion, up to the entirety of these locations, could comprise the gyroid infill 70. In other embodiments, the other inner wall, first inner wall 56A, and the outer wall 50 of the shell 30 could also be filled with the gyroid infill 70. An example of a gyroid infill structure is shown in FIG. 11.

A gyroid is an infinitely connected triply periodic minimal surface containing no straight lines. Gyroid structures are typically used in 3D printing to reduce weight of 3D printed objects, and to use the least amount of material while retaining the strength of the structure. The phrase "non-typically spaced", as used herein, refers to customized gyroid fill gaps. In one embodiment, the gyroid fill gaps are configured to increase the convolution of the channels inside the gyroid structure while still keeping the walls of the gyroid structure relatively separate. In the case of the sound suppressing device 20, the gyroid structure also provides convoluted paths for sound (that is generated by the tool) to travel through, thereby dampening the sound.

The non-typically spaced gyroid infill structure 70 can be made from any suitable materials, and in any suitable manner. In one embodiment, the gyroid structure 70 is formed by 3D printing using INSIGHT™, a program available from Stratasys, Ltd, Edina, MN In this embodiment, the gyroid structure 70 is made from FDM® (fused deposition modeling) ASA (acrylonitrile styrene acrylate) UV stable thermoplastic filament material. The gyroid structures 70 are formed inside the shell 30 and the inner wall 56B when 3D printing these parts as a single piece. In this embodiment, the channels of the gyroid structure are not filled, other than with air.

The sound suppressing device 20 may have at least one window 32 therein so that the person using the sound suppressing device 20 can see the object that they are working on with the equipment. There can be any suitable number of windows, and the window(s) can be in any suitable location on the sound suppressing device 20. In the embodiment shown, the top of the device 20 is provided with a single window therein. In this embodiment, the window 32 forms a substantially flat surface on the top of the sound suppressing device 20. The window(s) 32 can be constructed in any suitable manner.

FIGS. 2 and 3 show that, in this embodiment, the window 32 comprises a layered window structure (or set of windows). There can be any suitable number of window layers (e.g., 2, 3, 4, etc.). The layered window structure 32 fits into a recess 60 in the top of the shell 30. The window structure 32 has a central opening 46 therein. The central opening 46 is sized and configured to fit around the equipment or tool with which the sound suppressing device is to be used. The window layers are transparent, and separated by air and isolated via gaskets. The window layers can comprise any material suitable for providing visibility therethrough, withstanding vibration, and impact resistance. The layered window structure can, for example, comprise three PLEXIGLASS® acrylic glass layers on the top of the shell 30. These layers can be considered to be a top window 32A, a middle window 32B, and a bottom window 32C. Any of these can alternatively be referred to as window layers (e.g., top window layer, etc.)

Figure 5:
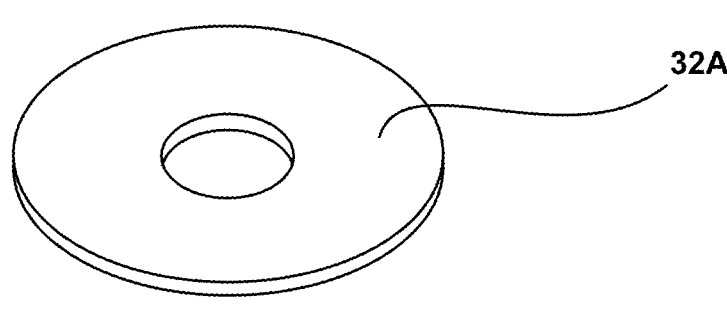
FIG. 5 is a perspective view of the top window layer of the sound suppressing device.
Figure 6:
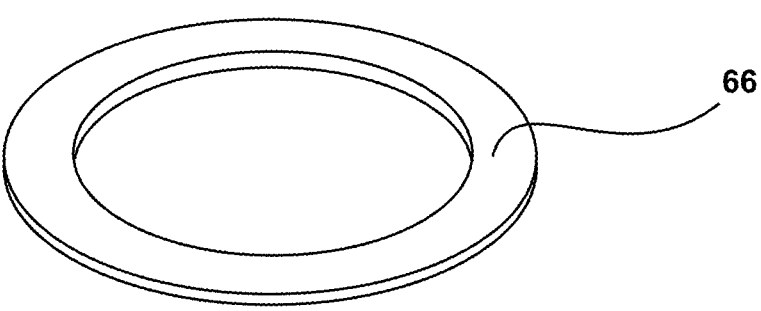
FIG. 6 is a perspective view of the primary gasket of the sound suppressing device.
Figure 7:
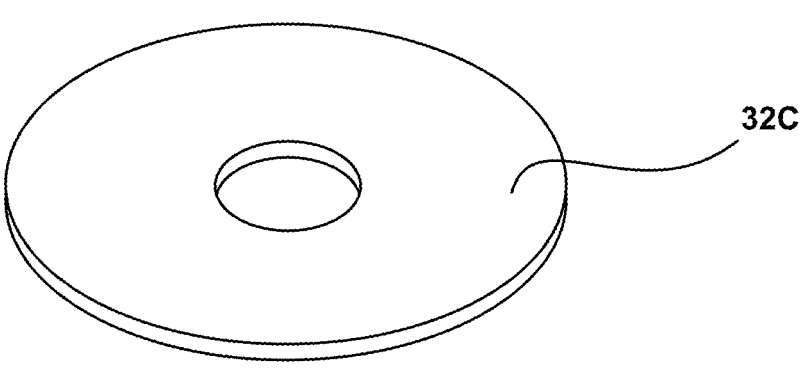
FIG. 7 is a perspective view of the bottom window layer of the sound suppressing device.
Figure 8:
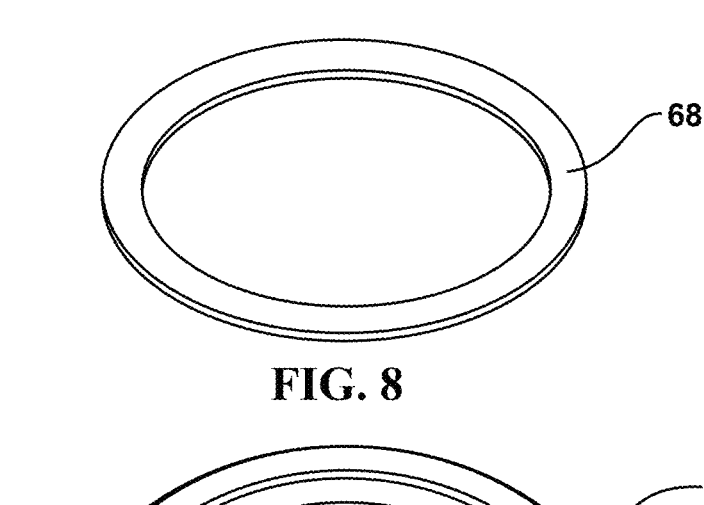
FIG. 8 is a perspective view of the secondary gasket of the sound suppressing device.
Figure 9:
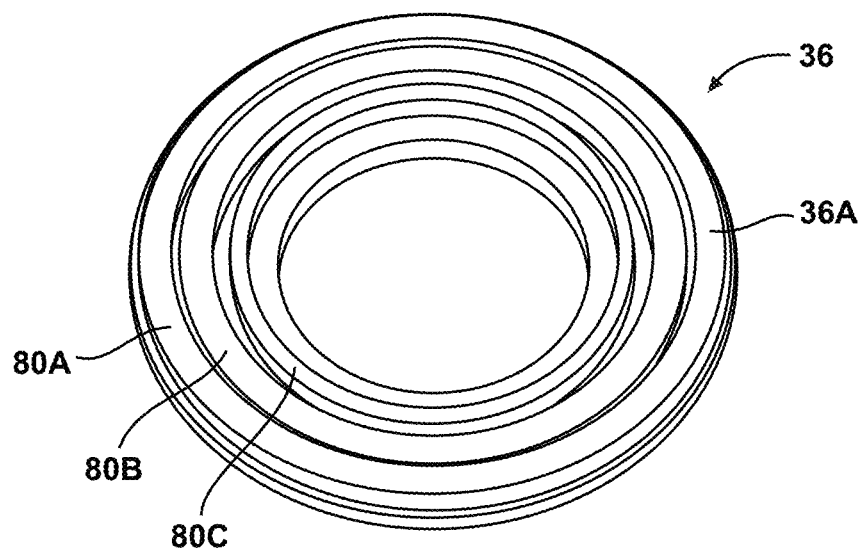
FIG. 9 is a perspective view of the lower containment seal of the sound suppressing device.

There can be gaskets (or elastic seals) between any of the window layers, as well as between the window layers and the shell 30 to dampen vibration, or for any other suitable purpose. The gaskets can be made of any suitable material including, but not limited to elastomeric materials such as mass loaded vinyl, rubber, and thermoplastic polyurethane (TPU). In the embodiment shown, there are gaskets under the top window layer 32A and over the bottom window layer 32C, and adhesive holding the gaskets in place. FIGS. 3 and 5-8 show the components of one embodiment of a window structure. FIG. 5 shows the configuration of the top window layer 32A (not to scale). The top window layer 32A is larger than the middle and bottom window layers 32B and 32C. FIG. 6 shows the primary gasket 66 that is positioned between the top window layer 32A and the middle window layer 32B. FIG. 7 shows the configuration of the bottom window layer 32C. The size and configuration of the middle window layer 32B may be the same. FIG. 8 shows the secondary gasket 68 that is positioned between the middle window layer 32B and the bottom window layer 32C. The primary gasket 66 is bonded underneath the top window layer 32A. The secondary gasket 68 is bonded to the underside of the middle window layer 32B.

There may be a space between the top window 32A and the bottom window 32C that is larger (in the direction of the axis A of the shell) than the thickness of the middle window layer 32B. The middle window layer 32B may be allowed to move or float freely in the space between the top and bottom window layers 32A and 32C to absorb vibratory and impact energy. The movement of the middle window layer 32B is, however, constrained within the walls forming the recess 60 in the shell 30. The free floating arrangement of the middle window layer 32B, may, for example, prevent a rivet or fastener that has been broken loose from the work surface 12 by the tool from having a direct path through (or crack) all three window layers.

The filler (or "filler material") 34 is shown in FIG. 10. The filler 34 is located in the interior compartments 54A and 54B between the walls. The filler 34 can comprise any suitable energy-absorbing and/or sound absorbing material. In some embodiments, the filler can be in the form of a fibrous batting material. In this embodiment, the fibrous material used for the fill is THERMAFIBER® mineral wool insulation available from Thermafiber, Inc., Wabash, Ind, U.S.A. The fiber media is packed tightly into the interior compartments 54A and 54B.

The containment seal 36 is shown in FIGS. 2, 3, 9 and 10. The containment seal 36 may be any suitable type of component that may be joined to the bottom of the shell 30 for the purpose of containing the filler material 34 within the shell 30 and for providing a suitable interface for contacting the work surface. The containment seal 36 may also serve the purpose of creating a localized seal on the work surface 12. The containment seal 36 may comprise a sound absorbing and/or sound dampening material.

The containment seal 36 has an inner surface 36A and an outer surface 36B. The inner surface 36A faces the interior of the shell 30. In one embodiment, the containment seal 36 is a single piece of flexible elastomer material. In this embodiment, the containment seal 36 is in the configuration of a ring-like disk having a central opening therein. The inner surface 36A of the containment seal 36 has a plurality of upwardly-oriented lower walls 80A, 80B, and 80C extending upwardly from the base of the containment seal 36. These upwardly-oriented walls fit into the space between the outer wall 50 of the shell 30 and the first inner wall 56A, and the space between the first and second inner walls 56A and 56B, respectively. The containment seal 36 press-fits into the base or lower surface 40 of the shell 30 to retain the fiber media 34 and absorb vibratory energy.

Figure 12:
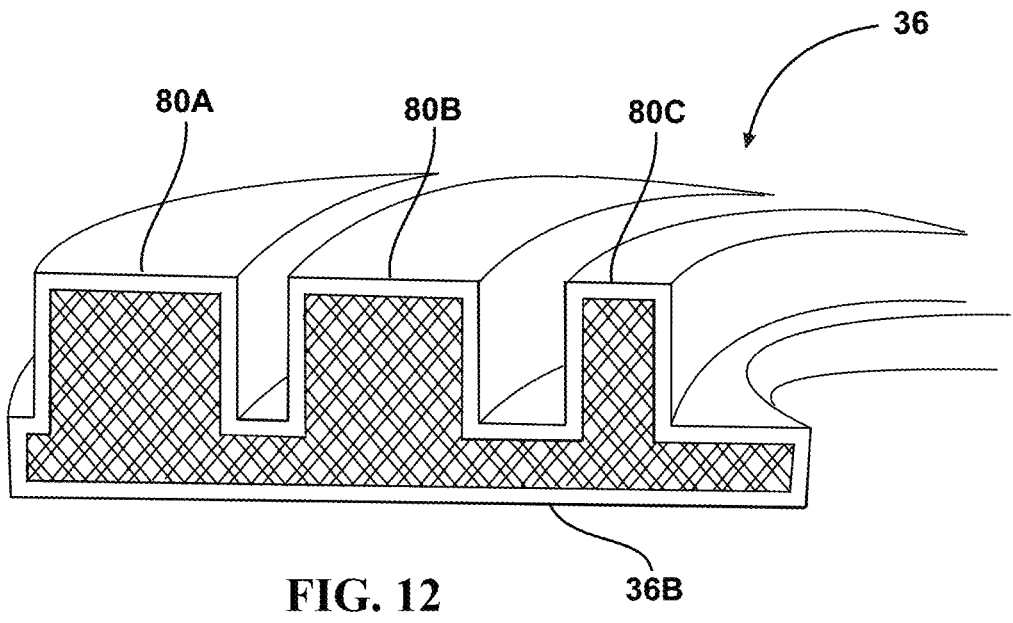
FIG. 12 is an enlarged cross-sectional view of a portion of a containment seal with a 45 degree matrix or lattice structure therein.

The containment seal 36 can be made of any material suitable for the above purposes including, but not limited to elastomeric materials such as thermoplastic polyurethane (TPU) or varioShore TPU which has variable Shore hardness. The containment seal 36 can be made in any suitable manner including, but not limited to by 3D printing. The varioShore TPU can be printed to provide a single material structure with different hardness in different portions of the structure. The containment seal 36 can also be 3D printed so that it has a matrix or lattice structure therein to provide the containment seal with strength, and/or for absorbing energy. FIG. 12 shows an example of a portion of a containment seal 36 with a 45 degree matrix or lattice structure therein.

FIG. 1 shows the sound suppressing device 20 in operation. The sound suppressing device 20 may be used with any of the types of tools described herein. The sound suppressing device 20 may, for example, be used during splice plate removal operations. Specifically, an air hammer is inserted into the central opening of the window, and a riveting set is installed into the end of the air hammer. The air hammer is then used to create shear force around bolts that the operator is attempting to remove from the splice plate. (Simultaneous hammering may also be done directly to the bottom of the bolts.) The sound suppressing device 20 encases the air hammer and creates a localized seal on the surface of the splice plates. In its current configuration, any relatively flat surface needing the application of an air hammer would be suitable. To provide the most amount of sound suppression, it is desirable for the containment seal 36 to be flush against the surface without overhanging an edge. The operator applies downward pressure on the now assembled apparatus to ensure the seal is complete. The operator then slides the sound suppressing device 20 across the surface of the splice plates, hammering when necessary.

FIG. 10 shows that the sound originates from a location S, and sound waves travel through the inner walls 56A and 56B, into the fill material 34, and back toward the containment seal 36. More specifically, the sound energy gets absorbed by the containment seal 36 on the bottom of the sound suppression device. The containment seal 36 may have a node-beam lattice oriented at a 45 degree angle that helps absorb energy. Any impact noise that travels up the shell 30 emanates through the shell into the internal batting and has to propagate through the gyroid infill. This structure focuses the sound back into the surface being hammered, while diffusing the sound emanating from the outer shell 30 up to the user. This suppresses the sound made by the tool during use.

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

The shell 30, or lower portions thereof, can provided with a degree of pliability. The shell 30, however, should not so pliable that it deforms, bends unduly, or collapses during use. Providing the shell with a degree of pliability will allow for applications on curved surfaces.

The containment seal 36 can be made thicker vertically, or be more pliable. Also, the internal lattice structure can be modified dimensionally, in node count, or in overarching geometry, to absorb specific individual sounds or sets of sound frequencies.

The sound suppressing device can be used in many industries in addition to its use in repairing military aircraft. The sound suppressing device can be used in the commercial aerospace industry. It can also be used in the auto-body repair industry. It could also be useful in listening devices. The sound suppressing device can be used in situations where a tool could cause a breach in a liquid containment tank, or gas tank. For example, the device coupled with the window and a properly sealed tool could allow a worker to pop open vessels with potentially caustic or dangerous elements and have some form of protection, dependent on materials used. Micro-geometric versions of the sound suppressing device could potentially be built on a micron scale to produce macro-level dampening effects.

The sound suppressing device described herein can provide a number of advantages. It should be understood, however, that these advantages need not be required unless they are set forth in the appended claims. The device may: reduce noise exposure from operating equipment; allow visibility of operations during use of the equipment; and protect the user from debris during use of the equipment.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A sound suppressing device for reducing the sound made when using a tool, which tool has a body and a functional part for interacting with a work surface, said device comprising:

a three-dimensional shell having an upper surface, a lower surface, an interior, and an outer wall, wherein the shell has an opening therein that extends between its upper surface and its lower surface, wherein the opening is sized and configured to fit around a portion of the body of the tool that will be adjacent the work surface when the tool is in use, wherein the upper surface of the shell is configured to be oriented further from the work surface than the lower surface;

a set of window layers in its upper surface that surrounds said opening so that a person using the sound suppressing device can see the work surface through said window layers, wherein said set of window layers comprises three transparent material layers comprising a top window layer, a middle window layer, and a bottom window layer, wherein said middle window layer is positioned between said top window layer and said bottom window layer and is unsecured to any portion of the sound suppressing device so that it is allowed to move freely between said top window layer and said bottom window layer;

at least one compartment located in the interior of said shell, wherein one compartment is located between the outer wall of said shell and at least one inner wall joined to the interior of said shell;

a filler material inside said at least one compartment; and a containment seal joined to the lower surface of said shell, wherein the sound suppressing device is configured so that the containment seal is positioned against the work surface when the sound suppressing device is in use so that said sound suppressing device suppresses noise generated between the functional part of a tool and the work surface.

2. A sound suppressing device for reducing the sound made when using a tool, which tool has a body and a functional part for interacting with a work surface, said device comprising:

an inverted bowl-shaped, three-dimensional shell having an upper surface, a lower surface, an interior, and an outer wall, wherein the shell has an opening therein that extends between its upper surface and its lower surface, wherein the opening is sized and configured to fit around a portion of the body of the tool that will be adjacent the work surface when the tool is in use, wherein the upper surface of the shell is configured to be oriented further from the work surface than the lower surface;

a set of window layers in the upper surface of said shell that surrounds the opening in said shell so that a person using the sound suppressing device can see the work surface through said window, wherein said set of window layers comprises three layers comprising: a top window layer, a middle window layer, and a bottom window layer, wherein said middle window layer is positioned between said top window layer and said bottom window layer and is unsecured to any portion of the sound suppressing device so that it is allowed to move freely between said top window layer and said bottom window layer;

a plurality of compartments located in the interior of said shell, said compartments comprising a first compartment that is located between the outer wall of said shell and a first inner wall and a second compartment that is located between the first inner wall and a second inner wall, wherein said first and second inner walls are joined to the underside of the upper portion of the shell on the interior of the shell, wherein said first and second inner walls have a configuration similar to the exterior wall of the shell, wherein at least a portion of said shell comprises a 3D printed structure with a gyroid infill, wherein said at least a portion of said shell that comprises a 3D printed structure with a gyroid infill comprises at least a portion of said second inner wall and an upper portion of the shell that is disposed above said compartments when said device is place on a work surface, wherein said gyroid infill is a non-typically spaced gyroid infill which comprises a plurality of spaced apart walls therein with convoluted channels therebetween, which is configured to increase the convolution of the channels inside the gyroid structure while still keeping the walls of the gyroid structure relatively separate;

a filler material inside said compartments, wherein said filler is an energy-absorbing material; and a containment seal that is joined to the lower surface of said shell, wherein the containment seal comprises a ring-like disk having an inner surface, an outer surface, a central opening therein, and a plurality of spaced-apart upwardly-oriented walls extending along the inner surface of the containment seal, wherein said first and second inner walls of said shell have ends that fit into the spaces between the upwardly-oriented walls of the containment seal, wherein the containment seal is comprised of an elastomeric material, wherein the containment seal is a 3D printed structure that comprises a node-beam lattice oriented at a 45 degree angle, wherein the sound suppressing device is configured so that the containment seal is positioned against the work surface when the sound suppressing device is in use so that said sound suppressing device suppresses noise generated between the functional part of a tool and the work surface.

* * * * *